United States Patent
Annan et al.

(10) Patent No.: US 9,100,819 B2
(45) Date of Patent: Aug. 4, 2015

(54) SYSTEM AND METHOD OF PROVISIONING AND REPROVISIONING A MOBILE DEVICE BASED ON SELF-LOCATING

(71) Applicant: Sprint Communications Company L.P., Overland Park, KS (US)

(72) Inventors: Brandon C. Annan, Westwood Hills, KS (US); John E. Belser, Olathe, KS (US); Dale S. Schempp, Lenexa, KS (US); Michelle Elizabeth Masterson, Overland Park, KS (US)

(73) Assignee: Sprint-Communications Company L.P., Overland Park, KS (US)

( * ) Notice: Subject to any disclaimer, the term of this patent is extended or adjusted under 35 U.S.C. 154(b) by 0 days.

(21) Appl. No.: 13/763,434

(22) Filed: Feb. 8, 2013

(65) Prior Publication Data
US 2014/0228042 A1 Aug. 14, 2014

(51) Int. Cl.
*H04W 4/00* (2009.01)
*H04W 8/26* (2009.01)
*H04W 4/02* (2009.01)
(Continued)

(52) U.S. Cl.
CPC ............ *H04W 8/26* (2013.01); *H04W 4/025* (2013.01); *H04W 48/18* (2013.01); *H04W 4/001* (2013.01); *H04W 48/16* (2013.01)

(58) Field of Classification Search
CPC ...... H04W 4/001; H04W 48/16; H04W 48/18
USPC ......... 455/418, 419, 434, 435.1, 435.3, 552.1
See application file for complete search history.

(56) References Cited

U.S. PATENT DOCUMENTS

| 7,165,191 B1 | 1/2007 | Vakrat |
| 7,266,371 B1 | 9/2007 | Amin et al. |
| 7,493,111 B2 | 2/2009 | Knowles |

(Continued)

FOREIGN PATENT DOCUMENTS

| WO | 2012078753 A1 | 6/2012 |
| WO | 2013169983 A1 | 11/2013 |

(Continued)

OTHER PUBLICATIONS

Foreign Communication from a Related Counterpart—International Search Report and Written Opinion, dated Nov. 14, 2013, PCT/US13/55023, filed on Aug. 15, 2013.

(Continued)

*Primary Examiner* — Charles Appiah
*Assistant Examiner* — Jaime Holliday

(57) ABSTRACT

A method of provisioning a mobile device is disclosed. The method comprises installing a first package on the mobile device, wherein the first package is configured to provision the mobile device with a first network. The method comprises installing a second package on the mobile device, wherein the second package is configured to provision the mobile device with a second network. The method comprises receiving one or more signals by the mobile device. The method comprises identifying at least a first network or at least a second network based on the one or more signals. The method comprises provisioning the mobile device with either the first network or the second network based on the identification of at least a first network or at least a second network, wherein provisioning comprises requesting provisioning data associated with at least a first network or at least a second network from a server.

18 Claims, 8 Drawing Sheets

(51) Int. Cl.
　　　*H04W 48/18*　　(2009.01)
　　　*H04W 48/16*　　(2009.01)

(56) References Cited

U.S. PATENT DOCUMENTS

| | | | |
|---|---|---|---|
| 7,817,988 B2 | 10/2010 | Kruis et al. | |
| 7,904,895 B1 | 3/2011 | Cassapakis et al. | |
| 8,107,926 B2 | 1/2012 | Goto | |
| 8,185,101 B1 | 5/2012 | Wiseman et al. | |
| 8,260,281 B2 | 9/2012 | Urbanek | |
| 8,401,538 B2 | 3/2013 | Urbanek | |
| 8,401,595 B2 | 3/2013 | Zhu et al. | |
| 8,433,953 B1 | 4/2013 | Gaudette et al. | |
| 8,571,536 B2 | 10/2013 | Urbanek | |
| 8,612,967 B1 | 12/2013 | Delker | |
| 8,626,165 B1 | 1/2014 | Narasimhan et al. | |
| 8,666,383 B1 | 3/2014 | Mauer et al. | |
| 8,825,039 B2 | 9/2014 | Mizuguchi | |
| 8,909,291 B1 | 12/2014 | Spanel et al. | |
| 2002/0091931 A1 | 7/2002 | Quick, Jr. et al. | |
| 2003/0217145 A1 | 11/2003 | Leung et al. | |
| 2004/0033798 A1 | 2/2004 | Robin et al. | |
| 2004/0092248 A1 | 5/2004 | Kelkar et al. | |
| 2004/0093109 A1 | 5/2004 | O'Connor et al. | |
| 2004/0116163 A1 | 6/2004 | Kim et al. | |
| 2004/0137890 A1 | 7/2004 | Kalke | |
| 2004/0137891 A1 | 7/2004 | Clark et al. | |
| 2005/0085222 A1 | 4/2005 | Przybilski et al. | |
| 2005/0119001 A1 | 6/2005 | Watanabe | |
| 2005/0188262 A1 | 8/2005 | Rosenman et al. | |
| 2005/0197098 A1 | 9/2005 | Trossen | |
| 2006/0025151 A1 | 2/2006 | Karaoguz et al. | |
| 2006/0135144 A1* | 6/2006 | Jothipragasam | 455/419 |
| 2006/0154651 A1 | 7/2006 | Knowles | |
| 2006/0203722 A1 | 9/2006 | Oommen | |
| 2006/0208071 A1 | 9/2006 | Chang et al. | |
| 2006/0235944 A1 | 10/2006 | Haslam | |
| 2006/0236325 A1 | 10/2006 | Rao et al. | |
| 2006/0246949 A1 | 11/2006 | Gupta et al. | |
| 2007/0004404 A1 | 1/2007 | Buckley et al. | |
| 2007/0082655 A1 | 4/2007 | Link, II et al. | |
| 2007/0099599 A1 | 5/2007 | Smith et al. | |
| 2007/0129057 A1 | 6/2007 | Xu et al. | |
| 2007/0130156 A1 | 6/2007 | Tenhunen et al. | |
| 2007/0165654 A1 | 7/2007 | Chai et al. | |
| 2007/0169084 A1 | 7/2007 | Frank et al. | |
| 2007/0190939 A1 | 8/2007 | Abel | |
| 2007/0197234 A1 | 8/2007 | Gill et al. | |
| 2007/0250645 A1 | 10/2007 | Meadows et al. | |
| 2007/0254635 A1 | 11/2007 | Montelius | |
| 2008/0039114 A1* | 2/2008 | Phatak et al. | 455/456.1 |
| 2008/0046583 A1 | 2/2008 | Rao | |
| 2008/0046880 A1 | 2/2008 | Jun et al. | |
| 2008/0046997 A1 | 2/2008 | Wang | |
| 2008/0062900 A1 | 3/2008 | Rao | |
| 2008/0065753 A1 | 3/2008 | Rao | |
| 2008/0109662 A1 | 5/2008 | Natarajan et al. | |
| 2008/0146280 A1 | 6/2008 | Sasse et al. | |
| 2008/0167027 A1 | 7/2008 | Gautier et al. | |
| 2008/0171532 A1 | 7/2008 | Shieh et al. | |
| 2008/0225806 A1 | 9/2008 | Arian et al. | |
| 2008/0281511 A1 | 11/2008 | Miyata | |
| 2008/0318547 A1 | 12/2008 | Ballou, Jr. et al. | |
| 2009/0061840 A1 | 3/2009 | Fleischman et al. | |
| 2009/0093242 A1 | 4/2009 | Bhalekar et al. | |
| 2009/0094350 A1 | 4/2009 | Rive et al. | |
| 2009/0106200 A1 | 4/2009 | Salinas et al. | |
| 2009/0124250 A1 | 5/2009 | Topaltzas et al. | |
| 2009/0156209 A1* | 6/2009 | Franklin et al. | 455/435.2 |
| 2009/0239518 A1 | 9/2009 | Feuillette | |
| 2009/0247124 A1 | 10/2009 | de Atley et al. | |
| 2009/0260004 A1 | 10/2009 | Datta et al. | |
| 2009/0307763 A1 | 12/2009 | Rawlins et al. | |
| 2010/0048193 A1 | 2/2010 | Ortion et al. | |
| 2010/0060456 A1 | 3/2010 | Forster | |
| 2010/0075669 A1 | 3/2010 | Sparks et al. | |
| 2010/0080143 A1 | 4/2010 | Topaltzas et al. | |
| 2010/0133335 A1 | 6/2010 | Maguid et al. | |
| 2010/0136960 A1 | 6/2010 | Knezevic | |
| 2010/0159876 A1 | 6/2010 | Brown et al. | |
| 2010/0161724 A1 | 6/2010 | Sathyan et al. | |
| 2010/0167696 A1 | 7/2010 | Smith et al. | |
| 2010/0192120 A1 | 7/2010 | Raleigh | |
| 2010/0203864 A1 | 8/2010 | Howard | |
| 2010/0207742 A1 | 8/2010 | Buhot et al. | |
| 2010/0222047 A1 | 9/2010 | Vanderlinden et al. | |
| 2010/0262638 A1 | 10/2010 | Fitzgerald | |
| 2010/0291898 A1 | 11/2010 | Sanding et al. | |
| 2010/0311404 A1 | 12/2010 | Shi et al. | |
| 2010/0312794 A1 | 12/2010 | Liu | |
| 2010/0325622 A1 | 12/2010 | Morton | |
| 2010/0332639 A1 | 12/2010 | Diaz et al. | |
| 2011/0003590 A1 | 1/2011 | Yoon et al. | |
| 2011/0014913 A1* | 1/2011 | Yoon et al. | 455/435.3 |
| 2011/0026501 A1 | 2/2011 | Sharaga et al. | |
| 2011/0028138 A1 | 2/2011 | Davies-Moore et al. | |
| 2011/0030062 A1 | 2/2011 | Hsu et al. | |
| 2011/0035421 A1 | 2/2011 | Laird-McConnell et al. | |
| 2011/0081885 A1 | 4/2011 | Sennett et al. | |
| 2011/0119716 A1 | 5/2011 | Coleman, Sr. | |
| 2011/0138074 A1 | 6/2011 | Onda et al. | |
| 2011/0161659 A1 | 6/2011 | Himawan et al. | |
| 2011/0165836 A1 | 7/2011 | Dixon et al. | |
| 2011/0208338 A1 | 8/2011 | Eteminan et al. | |
| 2011/0222404 A1 | 9/2011 | Watson et al. | |
| 2011/0230136 A1 | 9/2011 | Washiro | |
| 2011/0258249 A1 | 10/2011 | Biggs et al. | |
| 2011/0263294 A1 | 10/2011 | Kim et al. | |
| 2011/0296399 A1 | 12/2011 | Tugnawat et al. | |
| 2011/0306318 A1* | 12/2011 | Rodgers et al. | 455/410 |
| 2011/0314129 A1 | 12/2011 | Rezaiifar et al. | |
| 2012/0027059 A1 | 2/2012 | Zhao et al. | |
| 2012/0036282 A1 | 2/2012 | Chen et al. | |
| 2012/0046022 A1 | 2/2012 | Kalke et al. | |
| 2012/0047227 A1 | 2/2012 | Haggerty et al. | |
| 2012/0094684 A1 | 4/2012 | Reddy | |
| 2012/0106509 A1 | 5/2012 | Klingenbrunn et al. | |
| 2012/0129513 A1* | 5/2012 | van der Laak | 455/419 |
| 2012/0129572 A1 | 5/2012 | Johnstone et al. | |
| 2012/0135733 A1 | 5/2012 | Cormier et al. | |
| 2012/0158580 A1 | 6/2012 | Eram et al. | |
| 2012/0203824 A1 | 8/2012 | Oommen | |
| 2012/0208511 A1 | 8/2012 | Vanderlinden et al. | |
| 2012/0230587 A1 | 9/2012 | Arseneau | |
| 2012/0260095 A1 | 10/2012 | Von Hauck et al. | |
| 2012/0276872 A1* | 11/2012 | Knauth et al. | 455/411 |
| 2012/0282891 A1* | 11/2012 | Mohammed et al. | 455/406 |
| 2012/0282924 A1 | 11/2012 | Tagg et al. | |
| 2013/0023235 A1 | 1/2013 | Fan et al. | |
| 2013/0031191 A1 | 1/2013 | Bott | |
| 2013/0031234 A1 | 1/2013 | Alfano et al. | |
| 2013/0046951 A1 | 2/2013 | Jones | |
| 2013/0065578 A1 | 3/2013 | Raleigh et al. | |
| 2013/0072168 A1 | 3/2013 | Colucciello et al. | |
| 2013/0085914 A1 | 4/2013 | McPherson et al. | |
| 2013/0111461 A1 | 5/2013 | Zubas et al. | |
| 2013/0137417 A1 | 5/2013 | Urbanek | |
| 2013/0198567 A1 | 8/2013 | Ahmed et al. | |
| 2013/0303142 A1 | 11/2013 | Burcham et al. | |
| 2013/0310003 A1 | 11/2013 | Sadhvani et al. | |
| 2013/0311836 A1 | 11/2013 | Hurst et al. | |
| 2014/0045483 A1 | 2/2014 | Whidden | |
| 2014/0080467 A1 | 3/2014 | Urbanek | |
| 2014/0113610 A1 | 4/2014 | Ramprasad Satish et al. | |
| 2014/0206313 A1 | 7/2014 | Spanel et al. | |
| 2014/0228012 A1 | 8/2014 | Annan et al. | |
| 2014/0274032 A1 | 9/2014 | Shipley et al. | |
| 2014/0373184 A1 | 12/2014 | Mahaffey et al. | |
| 2015/0065105 A1 | 3/2015 | Masterson Michelle E. et al. | |

FOREIGN PATENT DOCUMENTS

| | | |
|---|---|---|
| WO | 2014046814 A1 | 3/2014 |
| WO | WO2014113128 A1 | 7/2014 |

(56) References Cited

FOREIGN PATENT DOCUMENTS

| WO | WO2014123758 A1 | 8/2014 |
| WO | WO2014123759 A1 | 8/2014 |
| WO | WO2014158430 A1 | 10/2014 |
| WO | WO2015030945 A1 | 3/2015 |

OTHER PUBLICATIONS

Mauer, Brian D., et al., "Automatic Branding of Generic Applications", filed Jan. 10, 2013, U.S. Appl. No. 14/152,627.
Urbanek, Robert E., "Generic Mobile Devices Customization Framework", filed Aug. 15, 2013, International Serial No. PCT/US13/55023.
Annan, Brandon C., et al.,"System and Method of Storing Service Brand Packages on a Mobile Device", filed Jan. 30, 2014, International Serial No. PCT/US14/13936.
Annan, Brandon C., et al.,"System and Method of Provisioning and Reprovisioning a Mobile Device Based on Self-locating", filed filed Jan. 30, 2014, International Serial No. PCT/US14/13939.
Foreign Communication from a Related Counterpart Application, "Preliminary Report on Patentability", dated Jun. 20, 2013, PCT/US2011/063736 filed on Dec. 7, 2011.
Foreign Communication from a Related Counterpart—International Search Report and Written Opinion, dated Jul. 24, 2013, PCT/US13/40278, filed on May 9, 2013.
Notice of Allowance dated Jun. 21, 2013, U.S. Appl. No. 13/752,386, filed Jan. 28, 2013.
Notice of Allowance dated Aug. 9, 2013, U.S. Appl. No. 13/149,505, filed May 31, 2013.
First Action Interview Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
Delker, Jason R., "Loading Branded Media Outside System Partition", filed Oct. 30, 2013, U.S. Appl. No. 14/066,947.
Foreign Communication from a Related Counterpart—International Search Report and Written Opinion, PCT/US2011/063736.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Urbanek, Robert E., "System and Method of Wireless Communication", filed Dec. 7, 2010, U.S. Appl. No. 12/962,620.
Urbanek, Robert E., "System and Method for Generic Mobile Phone Configuration", filed Jul. 24, 2012, U.S. Appl. No. 13/556,202.
Urbanek, Robert E., "System and Method for Generic Mobile Phone Configuration", filed Jan. 28, 2013, U.S. Appl. No. 13/752,386.
Delker, Jason R., "Loading Branded Media Outside System Partition", filed May 31, 2011, U.S. Appl. No. 13/149,505.
Burcham, Robert H., et al., "Self-Identification of Brand and Branded Firmware Installation in a Generic Electronic Device", filed May 9, 2012, U.S. Appl. No. 13/468,028.
Mauer, Brian D., et al., "Automatic Branding of Generic Applications", filed Dec. 23, 2011, U.S. Appl. No. 13/335,941.
Urbanek, Robert E., "Generic Mobile Devices Customization Framework", filed Sep. 18, 2012, U.S. Appl. No. 13/622,234.
Annan, Brandon C., et al.,"System and Method of Branding and Labeling a Mobile Device", filed Mar. 15, 2013, U.S. Appl. No. 13/844,104.
Annan, Brandon C., et al.,"System and Method of Storing Service Brand Packages on a Mobile Device", filed Feb. 8, 2013, U.S. Appl. No. 13/763,428.
Annan, Brandon C., et al.,"Electronic Fixed Brand Labeling", filed Feb. 8, 2013, U.S. Appl. No. 13/763,443.
Ghoshal, Jagannath, et al.,"Rebranding a Portable Electronic Device While Maintaining User Data", filed May 22, 2013, U.S. Appl. No. 13/899,567.
Ghoshal, Jagannath, et al.,"System and Method for Retrofitting a Branding Framework into a Mobile Communication Device", filed May 21, 2013, U.S. Appl. No. 13/899,566.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
First Action Interview Pre-Interview Communication dated Apr. 23, 2014, U.S. Appl. No. 13/622,234, filed Sep. 18, 2012.
Advisory Action dated Dec. 17, 2014, U.S. Appl. No. 13/622,234, filed Sep. 18, 2012.
Notice of Allowance dated Nov. 22, 2014, U.S. Appl. No. 13/744,861, filed Jan. 18, 2013.
First Action Interview Pre-Interview Communication dated Oct. 22, 2014, U.S. Appl. No. 13/763,428, filed Feb. 8, 2013.
Notice of Allowance dated Dec. 29, 2014, U.S. Appl. No. 13/831,504, filed Mar. 14, 2013.
First Action Interview Pre-Interview Communication dated Nov. 20, 2014, filed May 21, 2013.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Spanel, Robert L., et al., Patent Application entitled "Dynamic Remotely Managed SIM Profile" U.S. Appl. No. 14/522,586, filed Oct. 24, 2014.
Urbanek, Robert E., "Delivery of Branding Content and Customizations to a Mobile Communication Device", filed Sep. 22, 2014, International Serial No. PCT/US14/56778.
Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.
First Action Interview Pre-Interview Communication dated Sep. 22, 2014, U.S. Appl. No. 13/468,028, filed May 9, 2013.
Final Office Action dated Sep. 19, 2014, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Jul. 16, 2014, U.S. Appl. No. 13/744,861, filed Jan. 18, 2013.
Office Action dated Aug. 7, 2014, U.S. Appl. No. 13/831,504, filed Mar. 14, 2013.
Foreign Communication From a Related Counterpart Application, International Search Report and Written Opinion dated Jan. 24, 2014, International Application No. PCT/US13/68981 filed on Nov. 7, 2013.
Foreign Communication from a Related Counterpart—International Search Report and Written Opinion, dated Jun. 3, 2014,PCT/US14/16650, filed on Feb. 16, 2014.
Spanel, Robert L., et al., Patent Application entitled "Dynamic Remotely Managed SIM Profile" U.S. Appl. No. 13/744,847, filed Jan. 18, 2013.
Urbanek, Robert E., "Delivery of Branding Content and Customizations to a Mobile Communication Device", filed Oct. 23, 2013, U.S. Appl. No. 14/060,712.
Urbanek, Robert E., "Delivery of Branding Content and Customizations to a Mobile Communication Device", filed , 201, International Serial No. PCT/US14/56778.

(56) References Cited

OTHER PUBLICATIONS

Urbanek, Robert E., "Implementation of Remotely Hosted Branding Content and Customizations", filed Oct. 23, 2013, U.S. Appl. No. 14/085,474.

Urbanek, Robert E., "Subscriber Identity Module Virtualization", filed Nov. 20, 2013, U.S. Appl. No. 14/060,719.

Indurkar, Dhananjay, "System and Method of Branding a Device Independent of Device Activation", filed Jan. 24, 2014, U.S. Appl. No. 14/163,035.

Sumner, Bret D., "Directing Server Connection Based on Location Identifier", filed Aug. 15, 2013, U.S. Appl. No. 13/968,259.

Abou-El-Ella, Hassan, et al., "Segmented Customization Payload Delivery", filed Aug. 27, 2013, U.S. Appl. No. 14/010,518.

Sumner, Bret D., "Segmented Customization Package Within Distributed Server Architecture", filed Aug. 27, 2013, U.S. Appl. No. 14/010,522.

Masterson, Michelle E., et al., "Development and Testing of Payload Receipt by a Portable Electronic Device", filed Aug. 27, 2013, U.S. Appl. No. 14/010,523.

Masterson, Michelle E., et al., "System and Methods for Deferred and Remote Device Branding", filed Aug. 27, 2013, U.S. Appl. No. 14/010,524.

Masterson, Michelle E., et al., "System and Methods for Deferred and Remote Device Branding", filed Jul. 16, 2014, International Serial No. PCT/US14/46773.

Callan, Jeffery S., et al., "Delivery of Oversized Branding Elements for Customization", filed Nov. 6, 2013, U.S. Appl. No. 14/073,321.

Indurkar, Dhananjay, "Background Delivery of Device Configuration and Branding", filed Jan. 16, 2014, U.S. Appl. No. 14/157,507.

Ahn, Chul Jin, et al., "Separation of Client Identification Composition from Customization Payload to Original Equipment Manufacturer Layer", filed Nov. 8, 2013, U.S. Appl. No. 14/075,687.

Ghoshal, Jagannath, et al., "Multiple Carrier Partition Dynamic Access on a Mobile Device", filed Jun. 5, 2014, U.S. Appl. No. 14/297,429.

Indurkar, Dhananjay, "Activation Sequence Using Permission Based Connection to Network", filed Jan. 24, 2014, U.S. Appl. No. 14/163,041.

Ahn, Chul Jin, et al., "Customization for Preloaded Applications", filed Mar. 31, 2014, U.S. Appl. No. 14/231,718.

First Action Interview Office Action dated Mar. 16, 2015, U.S. Appl. No. 13/468,028, filed May 9, 2013.

Office Action dated Mar. 2, 2015, U.S. Appl. No. 13/622,234, filed on Sep. 18, 2012.

FAIPP Pre-Interview Communication dated Mar. 26, 2015, U.S. Appl. No. 14/522,586 filed on Oct. 24, 2014.

FAIPP Pre-Interview Communication dated Apr. 8, 2015, U.S. Appl. No. 13/844,104, filed Mar. 15, 2013.

Notice of Allowance dated Mar. 20, 2015, U.S. Appl. No. 13/763,428, filed on Feb. 8, 2013.

Notice of Allowance dated Jan. 22, 2015, U.S. Appl. No. 13/899,566, filed on May 21, 2013.

FAIPP Pre-Interview Communication dated Apr. 15, 2015, U.S. Appl. No. 14/060,712, filed on Nov. 20, 2013.

FAIPP Pre-Interview Communication dated Mar. 4, 2015, U.S. Appl. No. 14/010,518, filed on Aug. 27, 2013.

FAIPP Pre-Interview Communication dated Apr. 1, 2015, U.S. Appl. No. 14/010,522, filed on Aug. 27, 2013.

FAIPP Pre-Interview Communication dated Apr. 3, 2015, U.S. Appl. No. 14/010,523, filed on Aug. 27, 2013.

FAIPP Pre-Interview Communication dated Mar. 10, 2015, U.S. Appl. No. 14/010,524, filed on Aug. 27, 2013.

FAIPP Pre-Interview Communication dated Apr. 8, 2015, U.S. Appl. No. 14/157,507, filed on Jan. 16, 2014.

Foreign Communication from a Related Counterpart—International Preliminary Report on Patentability, dated Apr. 2, 2015, PCT/US13/55023, filed on Aug. 15, 2013.

Delker, Jason R., et al. "Subscriber Identity Module (SIM) Card Initiation of Custom Application Launcher Installation on a Mobile Communication Device," filed Mar. 4, 2015, U.S. Appl. No. 14/639,056.

Delker, Jason R., et al. "Network Access Tiered Based on Application Launcher Installation," filed Mar. 4, 2015, U.S. Appl. No. 14/639,060.

FAIPP Pre-Interview Communication dated Mar. 12, 2015, U.S. Appl. No. 13/972,827, filed on Aug. 21, 2013.

\* cited by examiner

SYSTEM AND METHOD OF PROVISIONING AND REPROVISIONING A MOBILE DEVICE BASED ON SELF-LOCATING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication based on network connectivity provided by base stations known as cell towers or sites. Electronic devices may obtain network connectivity through base stations with one or more service networks. A service data package may be stored on the mobile device wherein the service data package may be configured to provision the mobile device with a service network. Mobile devices provisioned for a particular network may not be operable when they are not in range of that particular network.

SUMMARY

In an embodiment, a method of provisioning a mobile device is disclosed. The method comprises installing a first package on the mobile device, wherein the first package is configured to provision the mobile device with a first network. The method further comprises installing a second package on the mobile device, wherein the second package is configured to provision the mobile device with a second network. The method further comprises receiving one or more signals by the mobile device. The method further comprises identifying at least a first network or at least a second network based on the one or more signals. The method further comprises provisioning the mobile device with either the first network or the second network based on the identification of at least a first network or at least a second network, wherein provisioning comprises requesting provisioning data associated with at least a first network or at least a second network from a server.

In an embodiment, a method provisioning a mobile device is disclosed. The method comprises installing a first package on the mobile device, wherein the first package is configured to provision the mobile device with a first network. The method further comprises installing a second package on the mobile device, wherein the second package is configured to provision the mobile device with a second network. The method further comprises receiving one or more signals by the mobile device. The method further comprises identifying at least a first network or at least a second network based on the one or more signals. The method further comprises permitting a user to select an identified network for provisioning with the mobile device. The method further comprises provisioning the mobile device with either the first network or the second network based on a user selection, wherein provisioning comprises requesting provisioning data associated with a selected network from a server.

In an embodiment, a method provisioning a mobile device is disclosed. The method comprises receiving a signal on the mobile device associated with the first network. The method further comprises provisioning the mobile device with the first network, wherein provisioning comprises installing provisioning data with a first package stored on the mobile device. The method further comprises receiving mobile service on the mobile device, wherein the mobile service is provided by the first network. The method further comprises removing the mobile device from the first network. The method further comprises receiving a signal on the mobile device associated with the first network. The method further comprises provisioning the mobile service with the first network without reinstalling provisioning data with the first package stored on the mobile device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
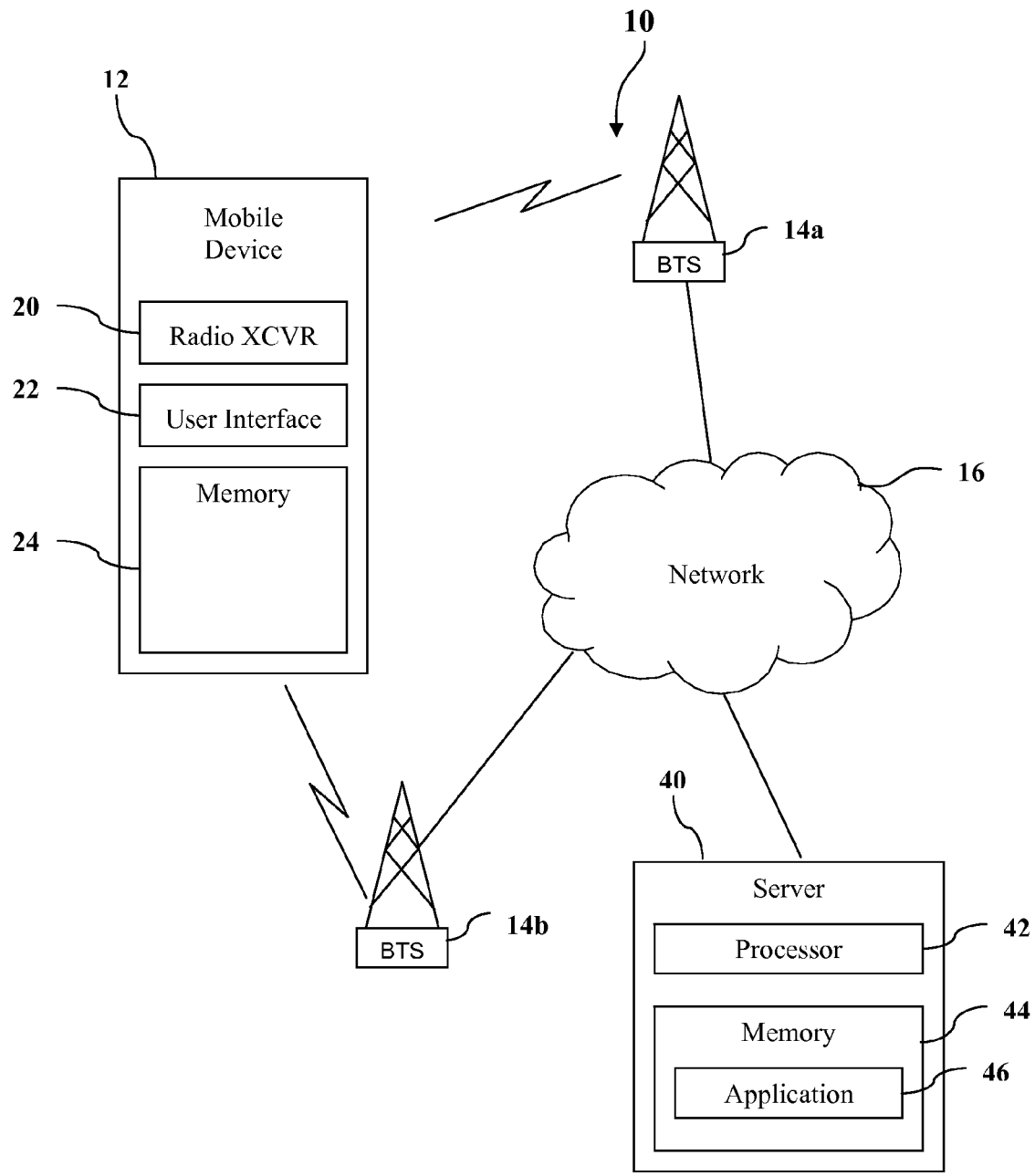
FIG. 1 is a block diagram of a provisioning system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

An apparatus and methods for provisioning and reprovisioning a mobile device with two or more service brand networks is described. Two or more unique service packages stored on the same mobile device may allow the same mobile device to be configured for different service networks, introducing complexity to inventory management and distribution as well as increased mobile service range. A mobile user may travel between two or more locations without losing mobile service. For example, a first service package and a second service package may be stored on the mobile device. The first service package may be configured to provide mobile service to the mobile device via a first service network. The second service package may be configured to provide mobile service to the mobile device via a second service network. Initially, the mobile device may be located in a first location and may be detecting a base transceiver station (BTS), for example a first BTS, providing wireless connectivity via a first service network. While in this first location, the mobile device may have received an identification signal from the first BTS identifying the first BTS. The mobile device may then associate the first BTS with a network such a first service network. The mobile device may thus identify that the first BTS may provide wireless service using the first service network. The mobile device may request provisioning data for the first service package from a server via the first BTS based on the identification signal from the first BTS. The mobile device may also trigger activation of the first service package based on the identification of the first BTS. The server may provide the requested provisioning data, for example, through wireless communication provided by the first BTS. The provision data may have been installed on the mobile device with a first service package provisioning the mobile device with a first service network allowing the mobile device to receive service.

Subsequently, the user of the mobile device may desire to move to a second location. Once at the second location, the mobile device may have dissociated with the first service network, for example, because the mobile device is not within reach of the first BTS and thus does not receive service via the first service network. While in the second location, the mobile device may have received an identification signal from a second BTS identifying the second BTS. The mobile device may then associate the second BTS with a network such a second service network. The mobile device may thus identify that the second BTS may provide wireless service using the second service network. The mobile device may request provisioning data for the second service package from the server via the second BTS based on the identification signal from the second BTS. The mobile device may also trigger activation of the second service package based on the identification of the second BTS. The server may provide the requested provision data, for example, through wireless communication provided by the second BTS. The provisioning data may be installed on the mobile device with a second service package provisioning the mobile device with a second service network allowing the mobile device to receive service. Thus, a user of a mobile device may be able to travel to multiple locations with different networks without losing mobile service.

In an embodiment, a user of the mobile device may be able to travel to multiple locations without losing service and without having to re-provision the mobile device with a network each time the mobile user desires to utilize that network. For example, a mobile device may initially be provisioned with a first service network. Similar to previous embodiments, the mobile device may have detected a BTS, for example a first BTS, providing wireless connectivity via a first service network. The mobile device may have also received an identification signal from the first BTS indicating that the first BTS may provide wireless service using the first service network. The mobile device may request provisioning data for the first service package from a server via the first BTS based on the identification signal from the first BTS. The server may provide the requested provisioning data, for example, through wireless communication provided by the first BTS. The provision data may have been installed and stored on the mobile device with a first service package provisioning the mobile device with a first service network allowing the mobile device to receive service.

The user of the mobile device may desire to move to a second service network. The mobile device may also have been loaded with a second service package associated with a second service network. Similar to previous embodiments, the mobile device may detect a second BTS, providing wireless connectivity via a second service network. The mobile device may receive an identification signal from the second BTS indicating that the second BTS may provide wireless service using the second service network. The mobile device may request provisioning data for the second service package from a server via the second BTS based on the identification signal from the second BTS. The server may provide the requested provisioning data, for example, through wireless communication provided by the second BTS. The provision data may be installed and stored on the mobile device with the second service package provisioning the mobile device with a second service network allowing the mobile device to receive service.

Once receiving mobile service via the second service network, the mobile device user may then return to the first service network. However, because the mobile device was previously on the first service brand network and provisioning data was previously installed with the first service package and stored on the mobile device, reinstalling of provisioning data for the first service brand network may not be needed for the mobile device to receive service with the first service network. This feature allows for ease of transition between service networks and reduces the amount of data transfer when a mobile device moves from one network to another network.

In an embodiment, the mobile device may receive a GPS signal informing the mobile device of its current location. The mobile device may access a lookup table which associates networks with locations and maps the location of the mobile device identified by the GPS signal with a network associated with the location of the mobile device. The mobile device may trigger the activation of package configured for the associated network.

A mobile user may desire to switch service networks while in a particular location. Two or more unique service packages stored on the same mobile device may allow the same mobile device to be configured for different service networks, introducing network choice flexibility. A mobile device may receive an identification signal from a first BTS and an identification signal from a second BTS in the same or similar location. Based on the BTS identifications, the mobile device may associate the first BTS with a first service network and the second BTS with a second service network. The user of the mobile device may be able to select a desired mobile service network, such as a first service network or a second service network, based on, for example, signal strength, to receive mobile service. For example, a user may be located in New York City where the user's mobile device receives an identification signal from a first BTS. The mobile device may then identify a first network based on the identification of the first BTS and receive wireless service using service network A. The mobile device may also identify a second network based on the identification of a second BTS and receive wireless service using service network B. The mobile device may display a menu or a user interface (e.g. on the mobile device display) indicating to a mobile device user that the mobile device detects service network A (i.e. the first BTS) and service network B (i.e. the second BTS). Initially, the mobile device user may select to receive mobile service on service network A using similar provisioning steps as previously described. The mobile user may then move into a building where the service network B provides a stronger signal. The mobile device user may again access the user interface and select service network B moving the mobile device to service network B and removing the mobile device from service network A. By selecting service network B, the mobile device may receive service on the service network B using similar provisioning steps as previously described.

Turning now to FIG. 1, a communication system 10 is described. The system 10 comprises a mobile device 12, base transceiver stations (BTS) 14a and 14b, a network 16, and a service awareness provisioning server 40. In an embodiment, the service awareness provisioning server 40 may be configured to store provisioning data associated with one or more networks. For example, the service awareness provisioning server may store provisioning data associated with a first network and provisioning data associated with a second network. The provision data is configured to be installed on the mobile device 12, as will be discussed further herein. In an embodiment, the system 10 may further comprise two or more service awareness provisioning servers 40. For example, a first service awareness provisioning server may store provisioning data associated with a first network while a second service awareness provisioning server may store provisioning data associate with a second network.

The mobile device 12 may be a mobile phone, a personal digital assistant (PDA), a media player, or other communication enabled portable electronic device. In an embodiment, the mobile device 12 may be implemented as a handset. Details of handsets are discussed further hereinafter. The base transceiver stations 14a and 14b provide a communication link to the mobile device 12 and couples the mobile device 12 to the network 16. In an embodiment, the base transceiver stations 14a and 14b provide wireless communication links to the mobile device 12 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While two base transceiver stations 14a and 14b are illustrated in FIG. 1, it is understood that the communication system 10 may comprise two or more base transceiver stations 14 and any number of mobile devices 12. The network 16 may be a public communication network, a private communication network, or a combination thereof.

The mobile device 12 may comprise a radio transceiver 20, a first user interface 22, and a memory 24. Alternatively, the mobile device 12 may comprise two or more radio transceivers 20. In an embodiment, the memory 24 may store two or more service packages. A first service package may be configured to provision the mobile device for communication with a first service network. A second service package may be configured to provision the mobile device for communication with a second service network. The service packages such as the first service package and the second service package may comprise executables for provisioning the mobile device with a service network. One of ordinary skill in the art will appreciate after reading this disclosure the various elements comprising a service package which may allow a service package to provision a mobile device with a service network. The service awareness provisioning server 40 may comprise a processor 42, a memory 44, and an application 46 stored in the memory 44. The service awareness provisioning server 40 may also comprise a plurality of processors located in a plurality of computers. Computers are discussed in more detail hereinafter.

The application 46, when executed by the processor 42 of the service awareness provisioning server 40, may receive an activation message from a mobile device 12, the mobile device 12 storing at least a first service package employed by a first service network and a second service package employed by a second service network. In response to the activation message, the application 46 identifies at least one of the service packages stored on the mobile device 12, for example the first service package and based on the first service package, a reference to content is written over-the-air to the memory 24 of the mobile device 12. The application 46 may link the first service network to the mobile device 12 by looking up in a data store (not shown) a wireless communication service provisioned for the mobile device 12 with the first service package using an electronic serial number (ESN) of the first service package, other identifying information of the first service package and/or combinations thereof. One of ordinary skill in the art will appreciate after reading this disclosure the various embodiments a provisioning server, such as service awareness provisioning server 40, may identify a particular activation message from a service package.

It should be noted that the service awareness provisioning server 40 may also reside in a distribution center or warehouse, and that some or all provisioning events may be completed in the distribution center. This would allow branding and customization to be accomplished prior to sending a plurality of mobile devices 12 to a retail point of sale or a large enterprise customer, whom all want to sell and/or use the mobile device on a particular service brand network, for example.

Figure 2:
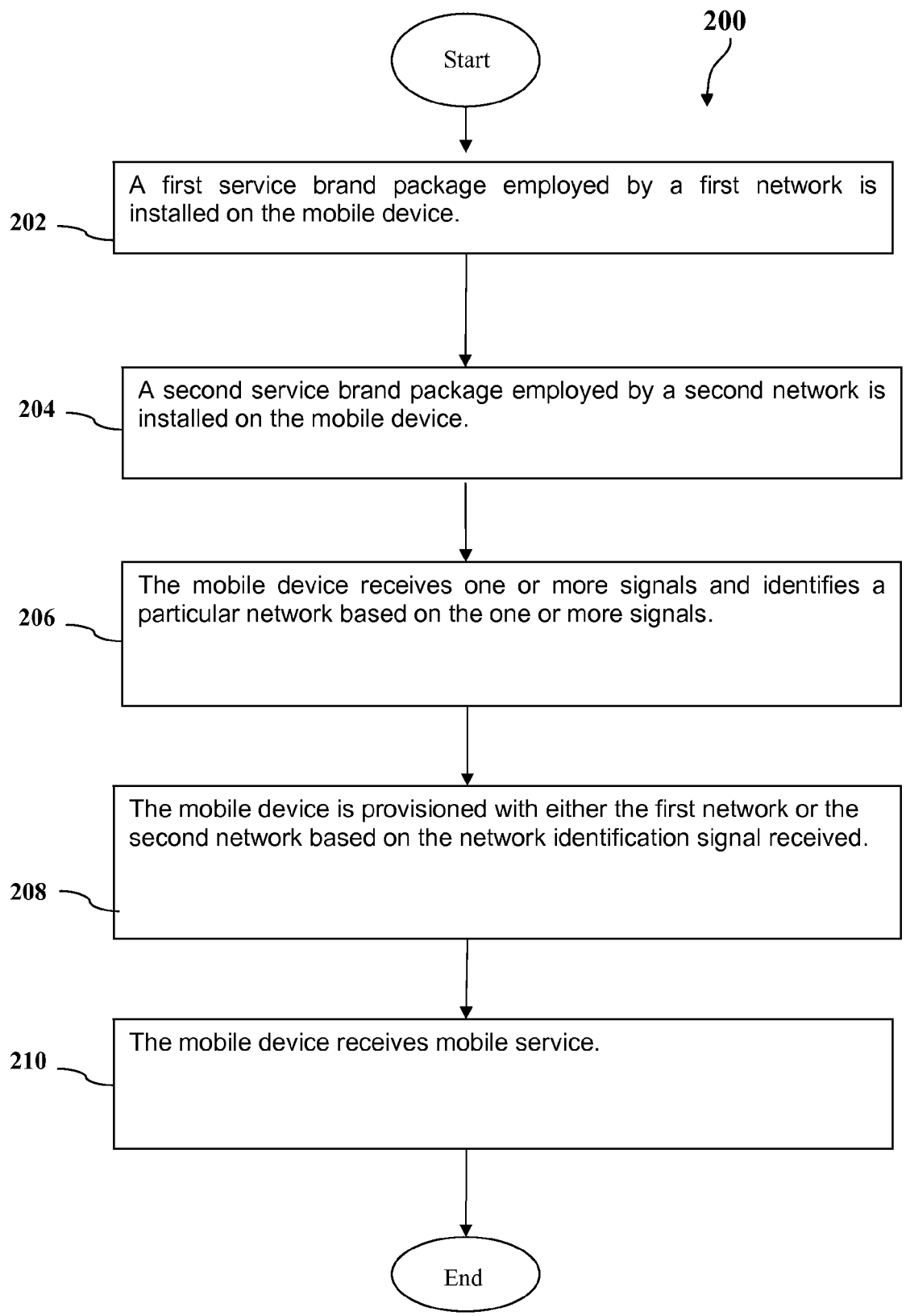
FIG. 2 is a flow chart of a method according to an embodiment of the disclosure.

In FIG. 2, a method 200 is described. At block 202, a first service package employed by a first service network may be installed on the mobile device. In an embodiment, the manufacturer of the mobile device may be instructed, for example by a specification, to install a first service package employed by a first service on the mobile device. The first service package may be configured to provision the mobile device to a first network. The first service package may be installed in the memory of the mobile device, such as memory 24.

At block 204, a second service package employed by a second service network may be installed on the mobile device. In an embodiment, the manufacturer of the mobile device may be instructed, for example by a specification, to install a second service package employed by a second service network on the mobile device. The second service package may be configured to provision the mobile device to a second network. In an embodiment, the second network may be located in a different geographic area than the first network. In an embodiment, the first and the second networks may at least partially overlap the same geographic area. In an embodiment, the first network and/or the second network may be a transportable network. For example, the first network may be confined to the cabin of an airplane such that as the airplane travels from one location to another, the network moves with the airplane. The second service brand package may be installed in the memory of the mobile device, such as memory 24.

For example, a mobile device may store a North American service package and an Asian service package. The North American service package may comprise executables and be configured to provision the mobile device with a North American network. The Asian service package may comprise executables and be configured to provision the mobile device with an Asian network. Initially, the mobile device may be located in British Columbia (a province of Canada located in North America). A BTS located near the mobile device (hereinafter the "NA BTS") may send a signal to the mobile device identifying that the NA BTS is configured to provide mobile service with the North American network. In response to receiving the identifying NA BTS signal, the mobile device may send a request, for example, via the NA BTS, to a server to request provisioning data to provision the mobile device with the North American network. The server may provide the requested provisioning data, for example, wirelessly via the NA BTS to the mobile device. The mobile device may install the provisioning data with the North American service package. The mobile device may then receive mobile service with the North American network via the NA BTS.

The mobile device may then leave North American and lose mobile service with the North American network. The mobile device may move to a location in Japan (a country on the continent of Asia). A BTS located near the mobile device (hereinafter Asian BTS) may send a signal to the mobile device identifying that the Asian BTS is configured to provide mobile service with the Asian network. In response to receiving the identifying Asian BTS signal, the mobile device may send a request, for example, via the Asian BTS to a server to request provisioning data to provision the mobile device with the Asian network. The server may provide the requested provisioning data, for example, wirelessly via the Asian BTS to the mobile device. The mobile device may install the provisioning data with the Asian service package. The mobile device may then receive mobile service with the Asian network via the Asian BTS.

In an embodiment, a third, fourth, and/or fifth service brand package employed by a third, fourth, and/or fifth service brand may be installed on the mobile device. One of ordinary skill in the art will appreciate after reading this disclosure the quantity of additional service brand packages which may be installed on the mobile device.

At block 206, the mobile device may receive one or more signals from a BTS. In an embodiment, receiving one or more signals may comprise receiving a system identifier number (SID) and/or a network identification (NID) signal identifying a particular BTS. The mobile device may then identify a particular service network, such as at least a first network or at least a second network based on the SID/NID identification signal identifying a particular BTS. For example, a mobile device may receive an SID/NID identification signal from a BTS. The mobile device may identify a first network providing service through the BTS based on the SID/NID identification signal. Upon identifying the first network, the mobile device may access a lookup table which maps the first network with either the first service package and/or the second service package. In an embodiment, the SID/NID identification signal may direct the mobile device to a remote location storing the lookup table. Conversely, the lookup table may be stored on the mobile device. Once mapped, the signal triggers the activation of the first service package associated with the first network.

As previously discussed, in an embodiment, receiving one or more signals may comprise receiving an SID/NID identification signal identifying a particular BTS. In an embodiment, the first service network may be associated with an SID/NID signal within a first power range and the second service network may be associated with an SID/NID signal within a second power range, wherein the first power range and the second power range are not the same power range. In an embodiment, the first power range and the second power range may not overlap. The mobile device may access a lookup table which maps the SID/NID signal with either the first service network and/or the second service network. The mobile device may then request provisioning data for either the first service package or second service package based on the mapping of the SID/NID signal associated with the first network or the second network. For example, a mobile device may receive an SID/NID signal at a first power level at 2.1 GHz. Upon receiving the signal, the mobile device may use a lookup table which maps signal power ranges with service networks. For example, the lookup table may indicate that a SID/NID signal with a first power level may be associated with a first network, a SID/NID signal with a second power level is associated with a second network, and a SID/NID signal with third power level is associated with a third network. The mobile device maps the power level received by the SID/NID signal with the range of power levels for each network listed in the lookup table to determine which service package stored on the mobile device will be triggered for activation. Conversely, if the mobile device determines that the received signal is not associated with a service network and thus a package stored on the mobile device, then none of the service packages on the mobile device may be triggered for activation.

In an embodiment, if the mobile device determines that the received signal is not associated with a service package stored on the mobile device, then the service brand package most recently activated may be triggered for activation. For example, a first North American package, a second North American package and a European package may be stored on a mobile device. Initially, the mobile device may be located in North America and have the first North American package activated on the mobile device allowing the mobile device to receive service via the first North American network. The mobile device may then move to Europe where the first North American package is deactivated and the European package is activated allowing the mobile device to receive service via a European network. The mobile device may then move back to North American, for example, in a location where the mobile device is unable to receive an SID/NID network identification signal from a BTS identifying either the first North American network or the second North American network. (This may also apply when the mobile device moves back to North America, for example, in a location where the mobile device is able to receive an SID/NID network identification signal from a BTS identifying both the first North American network and the second North American network.) The mobile device may detect that it is located in North America (for example, using a GPS signal) and trigger reactivation of the first North American package stored on the mobile device because (between the first North American package and the second North American package) the mobile device was most recently utilizing the first North American package. Thus, when the mobile device once again receives an SID/NID network identification signal identifying the first North American network, the mobile phone will be configured for operating on the first North American network. In an embodiment, after the mobile device has reactivated the first North American package, the mobile device may receive an SID/NID network identification signal from a BTS identifying the second North American network. At this time, the mobile device may then request provision data for the second North American package to configure the mobile device with the second North American network and deactivate the first North American package.

In an embodiment, receiving one or more signal by the mobile device may comprise receiving a global positioning signal by which the mobile device may calculate its geographical location. The first service package may be associated with a first geographical area and the second service package may be associated with a second geographical area, wherein the first geographical area and the second geographical area are not the same geographical area. In an embodiment, the first geographical area and the second geographical area may not overlap. The mobile device may access a lookup table which maps the GPS signal with either the first service package and/or the second service package. For example, a mobile device may receive a GPS signal indicating that the mobile device is in Kansas. Upon receiving the signal, the mobile device may use a lookup table which maps geographical locations with service packages. If the mobile device determines, using the lookup table, that the mobile device is located within a geographical area (e.g. Kansas) associated with a service package stored on the mobile device, the mobile device will trigger activation of that particular service brand package. Conversely, if the mobile device determines that the location of the mobile device is not associated with a service package stored on the mobile device, then none of the service packages on the mobile device may be activated. In an embodiment, if the mobile device determines that the received signal is not associated with a service package stored on the mobile device, then the service package most recently activated may be triggered for activation, as previously discussed. In another embodiment, if the mobile device determines that the received signal is not associated with a service package stored on the mobile device, then the service package associated with the geographical area closest to the mobile device may be triggered for activation.

In an embodiment, the mobile device may receive both an SID/NID signal and a GPS signal. For example, the mobile device may be powered on in a particular geographic area. The mobile device may then receive an SID/NID signal from a BTS. At or near the same time, the mobile device may also receive a GPS signal from which the mobile device determines its location. The mobile device may use both the SID/NID signal and the GPS signal to trigger the activation of an appropriate service package stored on the mobile device.

In an embodiment, the mobile device may map a received GPS signal after attempting to map a received SID/NID signal. For example, the mobile device may receive an SID/NID signal from a BTS having a signal strength that does not fall within a range associated with a network which can be mapped with one of the service packages stored on the mobile device. The mobile device may then map a GPS signal received by the mobile device, which implies a location based on GPS coordinates. Through a lookup table and the implied mobile device location, the mobile device maps which service package stored on the mobile device is to be triggered for activation.

In an embodiment, the mobile device may map a received GPS signal after failing to receive at least one SID/NID signal. For example, a mobile device may be in a remote location out of signal range from a signal tower. After a predetermined period of time where the mobile device does not receive an SID/NID signal, the mobile device may then use the GPS coordinates to map, select, and trigger activation to the appropriate service package stored on the mobile device.

At block 208, the mobile device is provisioned with either the first network or the second network based on the identification of at least one network by the signal received by the mobile device. For example, based on an SID/NID signal and/or a GPS signal received by the mobile device, the mobile device may trigger the activation of an appropriate service package on the mobile device. After triggering the activation of the appropriate service package, the mobile device may request provisioning data from a server and install provisioning data with the activated service package. By installing the provision data with the activated service package, the mobile device may be provisioned with a particular network, such as a first network or a second network.

At block 210, the method may further comprise that the mobile device receives mobile service. For example, once the mobile device is provisioned with the first network, the mobile device may receive mobile service through the first network. In an embodiment, receiving mobile service may comprise sending and/or receiving a text, phone call, internet access, and/or the like.

Figure 3:
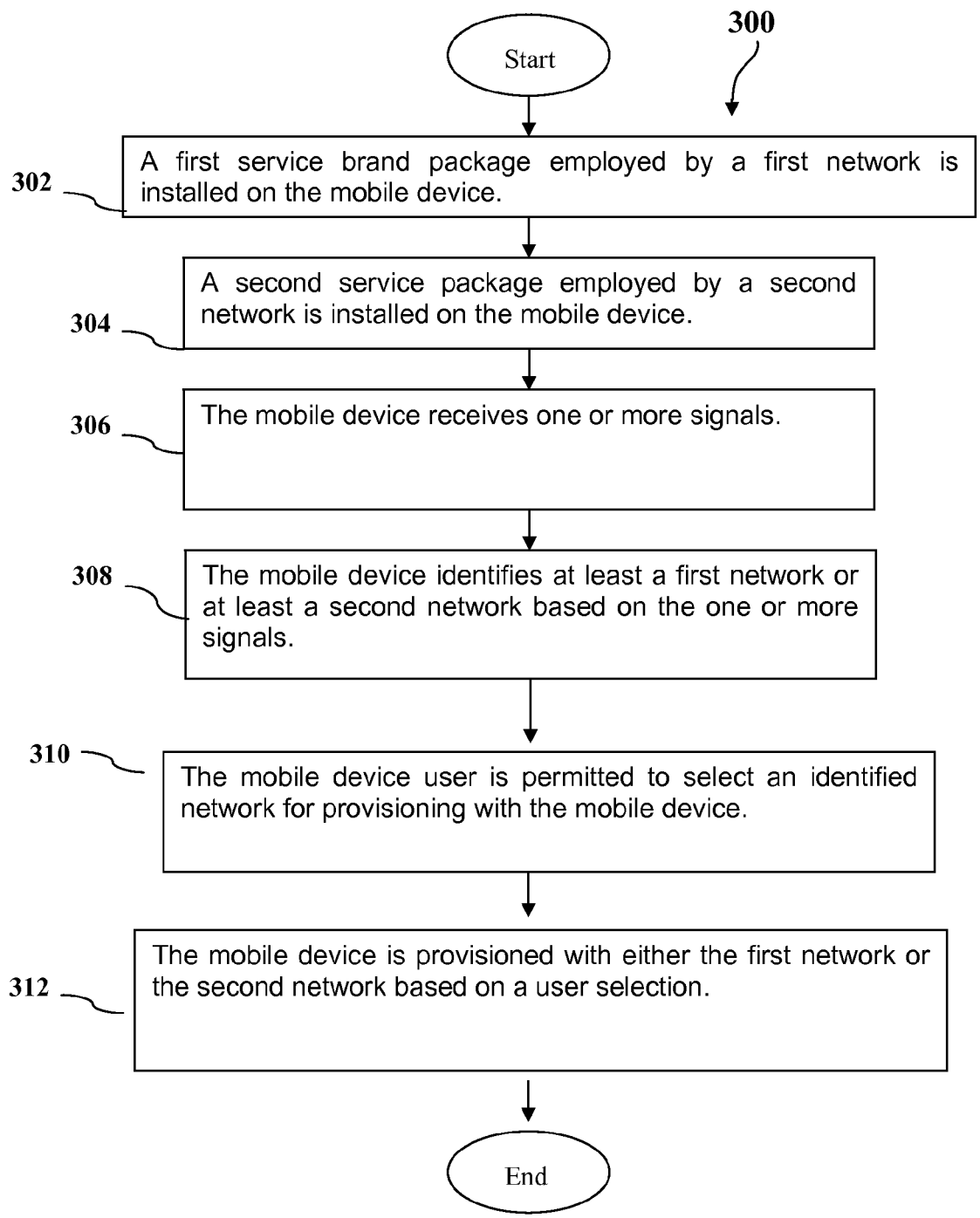
FIG. 3 is a flow chart of a method according to an embodiment of the disclosure.

In FIG. 3, a method 300 is described. At block 302, a first package employed by a first network may be installed on the mobile device. The first package may be configured to provision the mobile device with a first network. The first package may be installed in the memory of the mobile device, for example, memory 24.

At block 304, a second package employed by a second network may be installed on the mobile device. The second package may be configured to provision the mobile device with a second network. The second network may be located in the same geographic area as the first network. In an embodiment, the first and the second networks may at least partially overlap the same geographic area. In an embodiment, the second network may be located in a different geographic area than the first network. Like the first package, the second package may be installed in the memory of the mobile device, for example, memory 24.

In an embodiment, a third, fourth, and/or fifth service brand package employed by a third, fourth, and/or fifth service brand may be installed on the mobile device. One of ordinary skill in the art will appreciate after reading this disclosure the quantity of additional service brand packages which may be installed on the mobile device.

At block 306, the mobile device receives one or more signals. The one or more signals may be associated with at least a first network or at least a second network. In an embodiment, the one or more signals may comprise at least a BTS signal (e.g. a BTS identification signal) or at least a GPS signal. At block 308, the mobile device may identify at least a first network or at least a second network based on the one or more signals. For example, the mobile device may detect and/or receive a signal identifying a BTS (e.g. an SID/NID signal). The mobile device may then identify the first network based on the BTS identification. The mobile device may also detect and/or receive a GPS signal. The mobile device may then identify the second network based on the GPS signal.

At block 310, a mobile device user is permitted to select an identified network for provisioning the mobile device. An identified network may comprise a network identified by a signal received by the mobile device. For example, the mobile device may provide a selection menu, for example, on the mobile device display, allowing the user to select a preferred identified network. In an embodiment, the selection menu may allow the user to save a user made selection so that the user is not asked to select a network again, for example, when the user returns to the same general location. Additionally, the user may be permitted to access the selection menu when the user desires to switch networks.

In an embodiment, the mobile device user may be permitted to select whether the mobile device is to be provisioned with either the first network or the second network after receiving network identifications signals from a BTS associated with either the first package or the second package. For example, the mobile device may be in a location with at least a first network and second network. The mobile device may store at least a first package configured to provision the mobile device with the first network and a second package configured to provision the mobile device with the second network. Upon receiving at least one network identification signal from a BTS, such as an SID/NID signal and/or a GPS signal, identifying that the first service brand network and the second service brand network area available to the mobile device, a selection menu may be provided to the user to select either the first service brand network or the second service brand network. The user may then provide an input to the mobile device indicating which network the user prefers.

In an embodiment, the mobile device user may be permitted to select whether the mobile device is to be provisioned with either the first network or the second network before receiving network identification signals associated with either the first package or the second package. For example, the user of the mobile device may know that he/she will be going to a location where the mobile device will detect a network identification signal from a BTS associated with the first network and a network identification signal from the same BTS or another BTS associated with the second network. The user may pre-program the mobile device, using a web-based interface and/or a mobile device user interface, for example, to prefer one service brand network over another service brand package in that particular area. Additionally, if the user knows that he/she will be in a particular location for a particular amount of time, the user may be permitted to select a network so that the mobile device operates on that network for a fixed period of time. In an embodiment, after that fixed amount of time, the mobile device may then again ask the user to select a preferred network.

In an embodiment, a user may be permitted to select a hierarchy of user preferred networks. For example, a mobile device may store a first, second, third, and fourth package configured to provision the mobile device with a first, second, third, and fourth network, respectively. The user may prefer the first network over the second, third, and fourth networks. The user may also prefer the second network over the third and fourth networks. Additionally, the user may prefer the third network over the fourth network. Using a menu displayed on the mobile device user interface or web-based menu, for example, the user may select which networks are preferred in a hierarchy. Thus, when the mobile device enters a particular location and receives a network identification signal associated with a second network and network identification signal associated with a fourth network, the mobile device will automatically configure itself with the preferred second network, for example.

At block 312, the mobile device is provisioned with either the first network or the second network based on the user selection, wherein provisioning comprises activating either the first package or the second package. For example, based on an SID/NID signal and/or a GPS signal received by the mobile device and/or the user selection of a particular network, the mobile device may request provisioning data from a server for an appropriate package on the mobile device. The provisioning data may then be installed on the mobile device with the appropriate package and the appropriate package may be activated so that mobile to device may operate on an appropriate network. For example, by installing the provision data with the activated package, the mobile device may be provisioned with a particular network, such as the first network or the second network.

Regardless of how the mobile device may be provisioned with a network, the mobile device may be provisioned on only one service brand network at any one time. Thus, for example, if a mobile device is provisioned on the first, then the mobile device may not also be provisioned on the second network while the mobile is provisioned on the first network. Furthermore, if the mobile device is to be moved from a first network to a second network, the mobile device may require removal from the first network before being provisioned on the second network.

Figure 4:
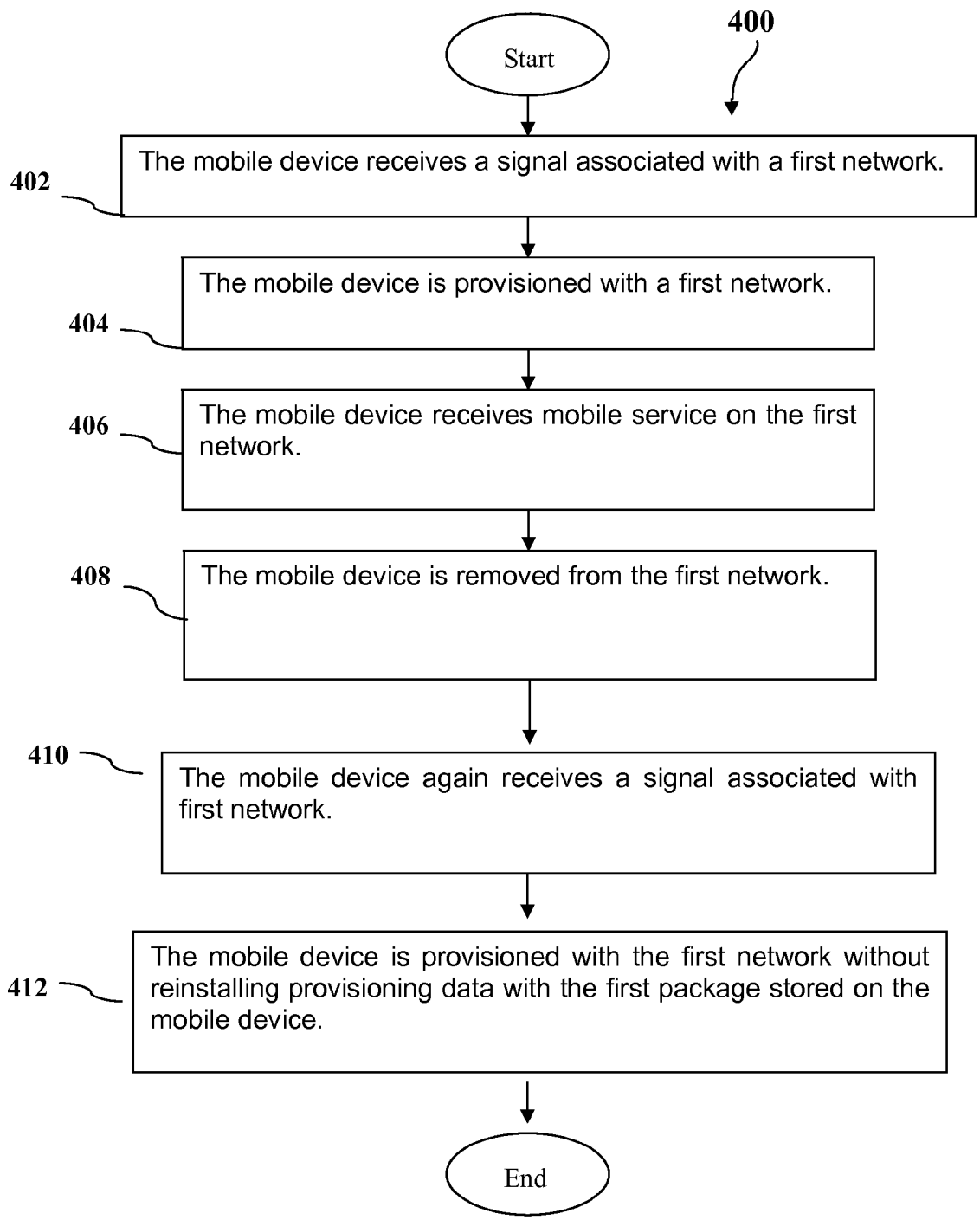
FIG. 4 is a flow chart of a method according to an embodiment of the disclosure.

In FIG. 4, a method 400 is described. At block 402, the mobile device receives a signal associated with a first network. Similar to previous embodiments, the mobile device may receive a first BTS identification signal associated with the first network. At block 402, the mobile device may receive a second BTS identification signal associated with the second network. Generally, the first and second signals comprise a network identification signal. For example, the first and second signals may be SID/NID signals and/or GPS signals.

At block 404, the mobile device is provisioned with a first network. In an embodiment, provisioning may comprise installing provisioning data with a first package stored on the mobile device. For example, the mobile device may receive a BTS identification signal and associate that signal with the first network. After associating the BTS signal with the first network, the mobile device may request provisioning data from a server such as the service awareness provisioning server 40 to be installed with the first package. The service awareness provisioning server may then wirelessly download provisioning data to the mobile device and install the provisioning data with the first network. In an embodiment, provisioning data may be installed on the mobile device with the first package by wirelessly downloading the data through the BTS to the mobile device from the server. In an embodiment, provisioning data may be installed on the mobile device with the first package by linking the mobile device with a USB port or a wire line linked to a server. One of ordinary skill in the art will appreciate after reading this disclosure the various embodiments by which installing provisioning data may be carried out.

In an embodiment, the provisioning data may be stored on the mobile device so that the provisioning data is not deleted when the mobile device is removed from the first network. For example, provisioning data may be installed on the mobile device with the first package in order to provision the mobile device with the first network. The provisioning data may be installed on a portion of the mobile device memory that protects the provisioning data when the mobile device no longer receives service on the first network and/or when the mobile device receives service on a second network. In an embodiment, the provisioning data may be installed on a portion of the mobile device memory that protects the provisioning data when the mobile device is reset to factory settings.

In an embodiment, the provisioning data for each package may be pre-installed and permanently stored on the mobile device. For example, a first, second, and third service brand package may be installed on the mobile device, wherein the first, second, and third packages are configured to provision the mobile device with the first, second, and third networks, respectively. Provisioning data may also be installed on the mobile device before the mobile device receives a network identification signal, before activating any one of the packages, and/or when the first, second, and third packages are installed on the mobile device.

In an embodiment, one set of provisioning data may be installed for all the packages. For example, the mobile device may store a first, second, and third package. One provisioning data package may be installed on the mobile device that allows the first package, the second package, and the third package to provision the mobile device with the first network, the second network, and the third network, respectively. In an embodiment, two or more sets of provision data may be installed for two or more packages stored on the mobile device. For example, similar to the previous embodiment, the mobile device may store a first, second, and third package. The mobile device may also store a first and second provisioning data package. The first provisioning data package may be associated with the first package and the second package, so that when the first package or the second package is activated, the mobile device may be provisioned with the first network or the second network. In an embodiment, provisioning data packages may be installed for each service brand package. For example, a first provisioning data package may be stored with a first package; a second provisioning data package may be stored with a second package; and a third provisioning data package may be store with a third package. When any one of the first, second, or third packages are activated the mobile device may be provisioned with the appropriate network.

At block 406, the mobile device receives mobile communication service on the first network. Once the mobile device is provisioned with a particular network, the mobile device may then receive communication service on that particular network. For example, the mobile device may receive text messages, internet access, email, interactive gaming, and/or the like. One of ordinary skill in the art will appreciate after reading this disclosure the various embodiments by which a mobile device receives mobile service.

At block 408, the mobile device is removed from the first network. In an embodiment, removing a mobile device from the first network may comprise moving to a location where the mobile device cannot reach the first network. For example, the mobile device may be located in New York and communicating via a first network. A user may transport the mobile device to Connecticut where the mobile device cannot reach the first network. Because the mobile device cannot reach the first network located in New York the mobile device is removed from the first network. In an embodiment, removing the mobile device from the first service brand network may comprise deactivating the first package on the mobile device associated with the first network. For example, a user may select a second network, via a selection menu, which deactivates the first package associated with the first network and activates a second package associate with a second network. In an embodiment, removing the mobile device from the first network may comprise resetting the mobile device to factory settings, for example by cycling the mobile device off and on. One of ordinary skill in the art will appreciate after reading this disclosure the various ways by which a mobile device may be removed from a service brand network.

At block 410, the mobile device may again receive an identification signal from a BTS associated with the first network. Receiving a signal associated with the first network may provision the mobile device with the first network. Similar to the previously described embodiment, receiving a signal may comprise receiving a SID/NID signal and/or a GPS signal which maps the mobile device via a lookup table with a particular package.

At block 412, the mobile device is provisioned with the first network without reinstalling provisioning data with the first package stored on the mobile device. Similar to previous embodiments, provisioning data may have previously been installed on the mobile device when the mobile device was initially provisioned with the first network. In an embodiment, provisioning data may have been installed when the first package is installed on the mobile device.

In an embodiment, the mobile device may receive a second identification signal from a BTS associated with a second network, for example, after removing the mobile device from the first network. In an embodiment, the mobile device may periodically receive signals for both a first network and a second network. Similar to previous embodiments, the mobile device may receive a signal from a second network when moving in range of a BTS identification signal associated with a second network.

Similar to provisioning the mobile device with the first network, the mobile device may be provisioned with the second network. In an embodiment, provisioning may comprise installing provisioning data with a second package stored on the mobile device. In an embodiment, provisioning the mobile device with the second network may also comprise selecting service with the second network via a user interface, as previously described. For example, a mobile device user may be in Colorado where network mobile service may be provided from a first network and a second network. Initially, the mobile device may be located in Denver and receive service on the first network. The user may be moving from Denver to Frisco deep in the Rocky Mountains. In Frisco, the first network and the second network may be provided. However, the second network may provide stronger connectivity in Frisco. The user may access the user interface and select the second network to utilize strong connectivity in Frisco. One of ordinary skill in the art will appreciate the various embodiments by which a mobile device may be provisioned with a network after reading this disclosure.

After provisioning the mobile device with the second network, the mobile device may also receive mobile service provided by a second network. Additionally, the mobile device may be removed from the second network, for example, before provisioning the mobile device with the first network. For example, the mobile device may be removed from the second network by selecting a different network via a user interface and/or moving out of range from the second network. One of ordinary skill in the art will appreciate the various embodiments by which a mobile device may be removed from the second network before provisioning the mobile device with the first network after reading this disclosure.

Figure 5:
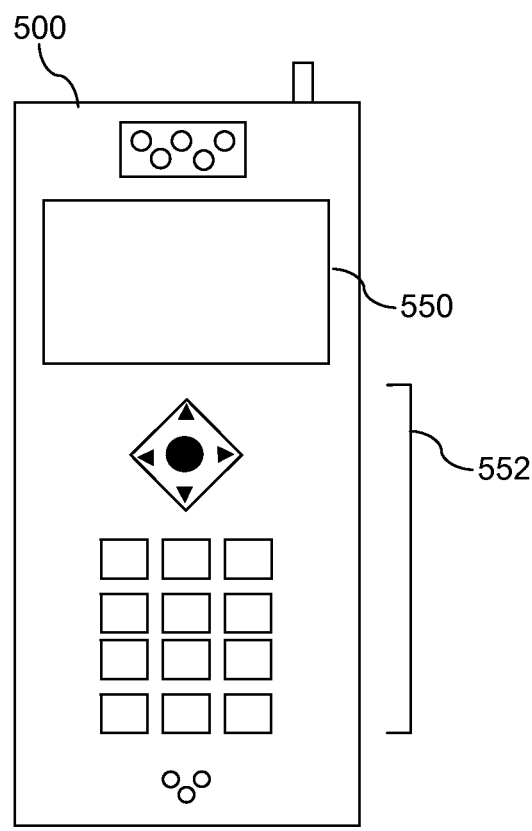
FIG. 5 is an illustration of a mobile device according to an embodiment of the disclosure.

FIG. 5 depicts the mobile device 500, which is operable for implementing aspects of the present disclosure, but the present disclosure should not be limited to these implementations. Though illustrated as a mobile phone, the mobile device 500 may take various forms including a wireless handset, a pager, a personal digital assistant (PDA), a gaming device, or a media player. The mobile device 500 includes a display 550 and a touch-sensitive surface and/or keys 552 for input by a user. The mobile device 500 may present options for the user to select, controls for the user to actuate, and/or cursors or other indicators for the user to direct. The mobile device 500 may further accept data entry from the user, including numbers to dial or various parameter values for configuring the operation of the handset. The mobile device 500 may further execute one or more software or firmware applications in response to user commands. These applications may configure the mobile device 500 to perform various customized functions in response to user interaction. Additionally, the mobile device 500 may be programmed and/or configured over-the-air, for example from a wireless base station, a wireless access point, or a peer mobile device 500. The mobile device 500 may execute a web browser application which enables the display 550 to show a web page. The web page may be obtained via wireless communications with a base transceiver station, a wireless network access node, a peer mobile device 500 or any other wireless communication network or system.

Figure 6:
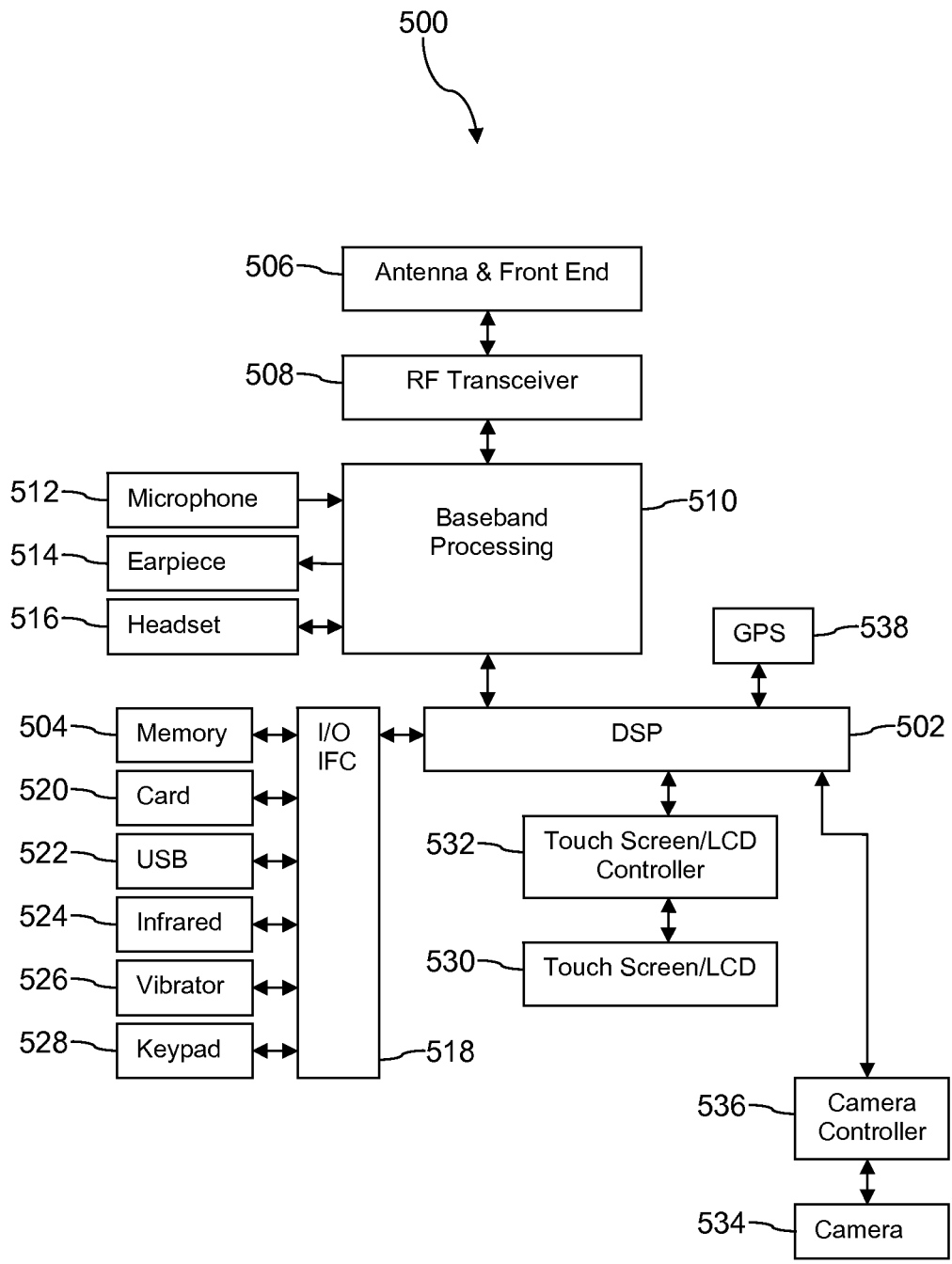
FIG. 6 is a block diagram of a mobile device according to an embodiment of the disclosure.

FIG. 6 shows a block diagram of the mobile device 500. While a variety of known components of handsets are depicted, in an embodiment a subset of the listed components and/or additional components not listed may be included in the mobile device 500. The mobile device 500 includes a digital signal processor (DSP) 502 and a memory 504. As shown, the mobile device 500 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 500 may include another kind of display that does not provide a touch sensitive screen. In an embodiment, the DSP 502 may communicate directly with the memory 504 without passing through the input/output interface 518. Additionally, in an embodiment, the mobile device 500 may comprise other peripheral devices that provide other functionality.

The DSP 502 or some other form of controller or central processing unit operates to control the various components of the mobile device 500 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 500 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 500. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 500 to determine its position.

Figure 7A:
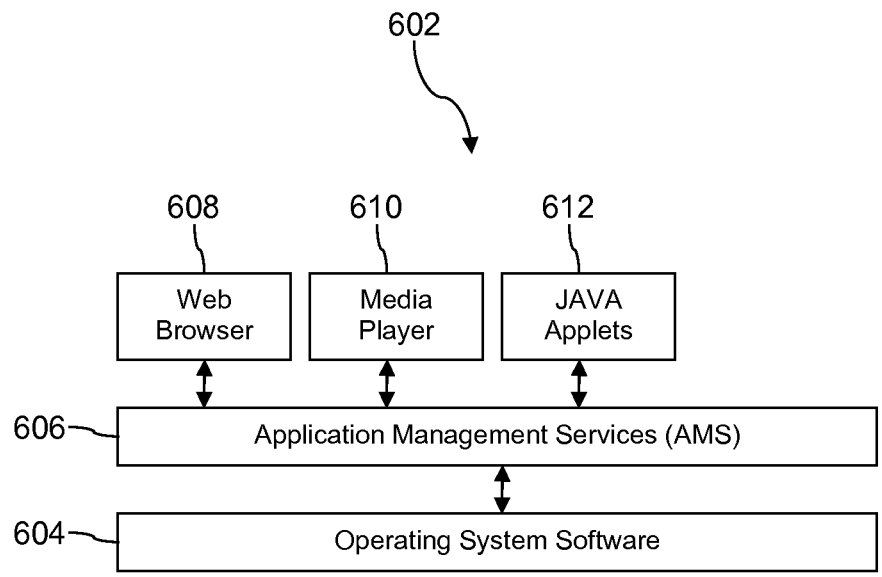
FIGS. 7A and 7B are block diagrams of software architecture for a mobile device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 500. Also shown in FIG. 7A are a web browser application 608, a media player application 610, and JAVA applets 612. The web browser application 608 may be executed by the mobile device 500 to browse content and/or the Internet, for example when the mobile device 500 is coupled to a network via a wireless link. The web browser application 608 may permit a user to enter information into forms and select links to retrieve and view web pages. The media player application 610 may be executed by the mobile device 500 to play audio or audiovisual media. The JAVA applets 612 may be executed by the mobile device 500 to provide a variety of functionality including games, utilities, and other functionality.

Figure 7B:
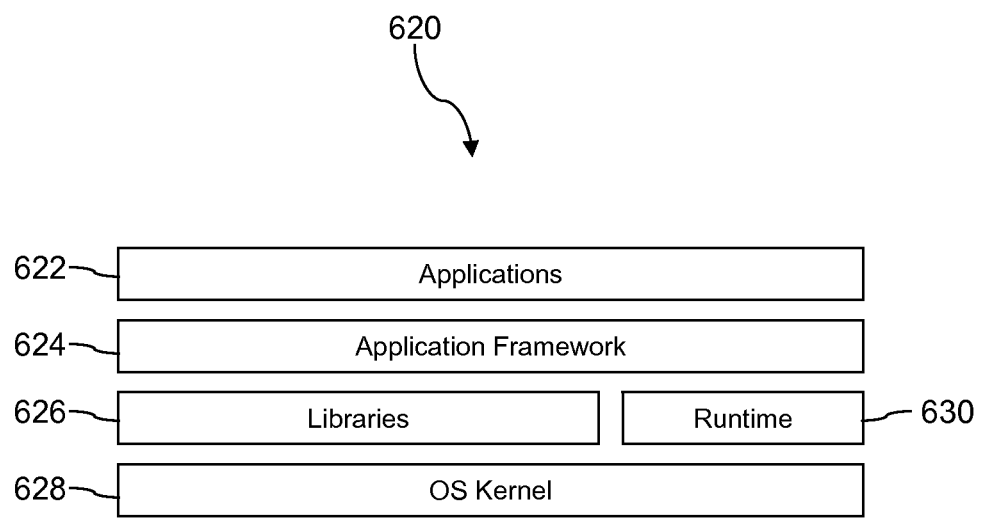

FIG. 7B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
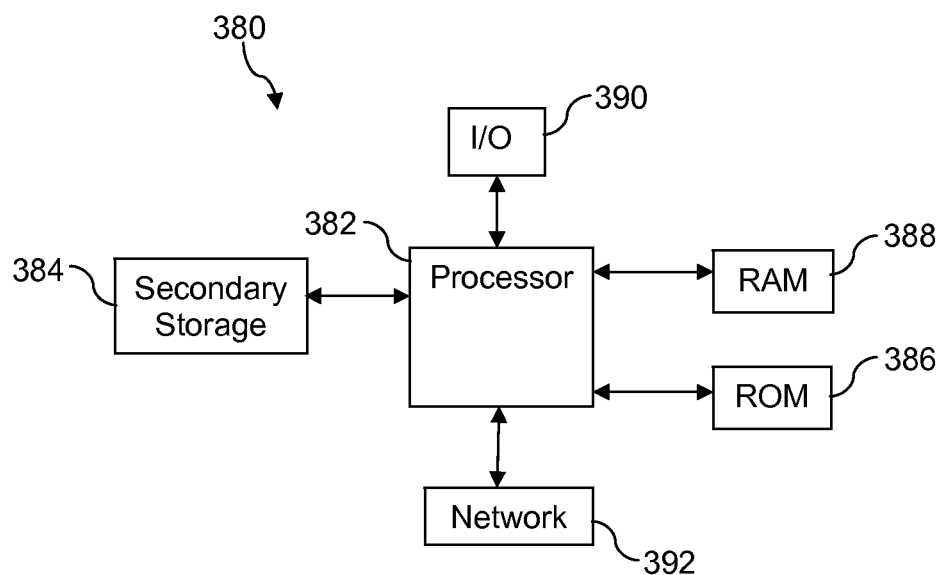
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of provisioning a mobile device, comprising:
   installing a first service brand package of a first service provider on the mobile device, wherein the first service brand package is configured to provision the mobile device with a first service brand network that is a first radio access network associated with the first service provider;
   installing a second service brand package of a second service provider on the mobile device, wherein the second service brand package is configured to provision the mobile device with a second service brand network that is a second radio access network associated with the second service provider;
   listening for reception of one or more signals by the mobile device, wherein the one or more signals is a system identifier number (SID) signal or a network identification (NID) signal from a base transceiver station associated with one of the first service brand network or second service brand networks;
   responsive to receiving the one or more signals by the mobile device,
      mapping, by the mobile device accessing a lookup table stored in a non-transitory memory of the mobile device, the received one or more signals to the first service brand package or the second service brand package based on the one or more signals and a power level of the one or more signals, and
      identifying the first service brand package or the second service brand package corresponding with at least the first service brand network or second service brand network based on the mapping via the lookup table;
   activating the first service brand package or the second service brand package based on the received one or more signals, the power level of the one or more signals, and the identification of the first service brand package or the second service brand package; and
   provisioning the mobile device with the first service brand package or the second service brand package based on the activation of the first service brand package or the second service brand package and the identification of the at least the first service brand network or the second service brand network, wherein provisioning comprises:
      using provisioning data associated with the first service brand package or the second service brand package, and
      branding and customizing the mobile device according to the first service provider or the second service provider through the use of their corresponding service brand package.

2. The method of claim 1, wherein provisioning further comprises:
   triggering activation of one of the first service brand package or the second service brand package; and
   installing provisioning data with the corresponding first service brand package or the second service brand package.

3. The method of claim 1, further comprising receiving mobile service on the mobile device, wherein the mobile service is provided by the at least one of the first service brand network or the second service brand network identified by the one or more signals received by the mobile device.

4. The method of claim 1, wherein listening for reception of the one or more signals by the mobile device comprises informing, by a processor of the mobile device, the mobile device of its geographical location using at least a received global positioning system (GPS) signal.

5. The method of claim 4, further comprising mapping a location of the mobile device based on the GPS signal with the first service brand package or the second service brand package by comparing the location of the mobile device with the lookup table that matches a particular location with the corresponding service brand network.

6. The method of claim 4, further comprising comparing the location indicated based on the GPS signal with the lookup table that matches at least one of a particular location or a particular signal strength range with one of the first service brand network or the second service brand network.

7. The method of claim 6, wherein provisioning the mobile device with the first service brand network or the second service brand network is based at least on at least one of the mapping of the GPS signal or the comparing the location indicated based on the GPS signal.

8. The method of claim 1, further comprising:
   installing a third service brand package on the mobile device, wherein the third service brand package is configured to provision the mobile device with a third service brand network;
   receiving one or more signals by the mobile device;
   identifying at least the first service brand network, the second service brand network, or the third service brand network based on the one or more signals; and
   provisioning the mobile device with the first service brand package, the second service brand package, or the third service brand package based on the identification of the at least the first service brand network, the second service brand network, or the third service brand network, wherein provisioning comprises using provisioning data associated with the first service brand package, the second service brand package network, or the third service brand package and branding and customizing the mobile device according to the first service provider, the second service provider, or a third service provider through the use of their corresponding service brand package.

9. The method of claim 1, wherein provisioning the mobile device occurs without reinstalling provisioning data associated with the first service brand package or the second service brand package stored on the mobile device.

10. The method of claim 1, further comprising:
responsive to failing to receive the one or more signals, calculating a geographic location of the mobile device, by a processor of the mobile device, based on receiving a global positioning system (GPS) signal, wherein the failure to receive the one or more signals is determined by the processor subsequent to the listening for reception of the one or more signals for a predetermined period of time.

11. The method of claim 10, further comprising:
based on the calculated geographic location of the mobile device, identifying at least one of the first service brand network or the second service brand network, wherein provisioning is based on the identification of the at least one of the first service brand network or the second service brand network.

12. A method of provisioning a mobile device, comprising:
installing a first service brand package of a first service provider on the mobile device, wherein the first service brand package is configured to provision the mobile device with a first service brand network that is a first radio access network associated with the first service provider;
installing a second service brand package of a second service provider on the mobile device, wherein the second service brand package is configured to provision the mobile device with a second service brand network that is a second radio access network associated with the second service provider;
listening for reception of a global positioning system (GPS) signal and one or more signals by the mobile device, wherein the one or more signals is a system identifier number (SID) signal or a network identification (NID) signal from a base transceiver station associated with one of the first service brand network or the second service brand network;
responsive to receiving the GPS signal and the one or more signals by the mobile device,
  determining a mapping, by the mobile device accessing a lookup table stored in a non-transitory memory of the mobile device, to the first service brand package or the second service brand package based on the one or more signals and a power level of the one or more signals, wherein determination of the mapping of the one or more signals depends on the power level of the one or more signals falling within a predefined range specified in the lookup table, and
  responsive to a determination, by the mobile device accessing the lookup table, that the one or more signals cannot be mapped to the first service brand package or the second service brand package based on the power level falling outside the predefined range, identifying the first service brand package or the second service brand package corresponding with at least the first service brand network or second service brand network based on mapping, by the mobile device accessing the lookup table, the first service brand package or the second service brand package to an implied mobile device location that is determined by the mobile device using the received GPS signal;
activating the first service brand package or the second service brand package based on the identification of the first service brand package or the second service brand package; and
provisioning the mobile device with the first service brand package or the second service brand package based on the activation of the first service brand package or the second service brand package, wherein provisioning brands and customizes the mobile device according to the first service provider or the second service provider through the use of their corresponding service brand package.

13. The method of claim 12, further comprising receiving mobile service on the mobile device, wherein the mobile service is provided by the first service brand network or the second service brand network.

14. The method of claim 12, further comprising removing the mobile device from the first service brand network or the second service brand network subsequent to user selection, and permitting the user to select another service brand network.

15. The method of claim 14, further comprising:
installing a third service brand package on the mobile device, wherein the third service brand package is configured to provision the mobile device with a third service brand network;
responsive to removing the mobile device from the selected service brand network for a predetermined amount of time, receiving one or more signals by the mobile device from a base transceiver station associated with one of the service brand networks that was not selected by the user;
identifying the first service brand network, the second service brand network, or the third service brand network based on the one or more signals received from the base transceiver station associated with the service brand network that was not selected by the user; and
provisioning the mobile device with the service brand package of the identified service brand network based on the one or more signals received from the base transceiver station associated with the service brand network that was not selected by the user, wherein provisioning brands and customizes the mobile device according to the first service provider, the second service provider, or a third service provider.

16. A method of provisioning a mobile device, comprising:
installing a first service brand package of a first service provider on the mobile device, wherein the first service brand package is configured to provision the mobile device with a first service brand network that is a first radio access network associated with the first service provider;
installing a second service brand package of a second service provider on the mobile device, wherein the second service brand package is configured to provision the mobile device with a second service brand network that is a second radio access network associated with the second service provider;
listening for reception of a signal on the mobile device associated with the first network, wherein the signal is one of a system identifier number (SID) signal or a network identification (NID) signal from a base transceiver station associated with the first service brand network;
responsive to receiving the signal, mapping, by the mobile device accessing a lookup table, the received signal to a first service brand package based on the signal and a power level of the signal, wherein the lookup table is stored in a non-transitory memory of the mobile device, and identifying the first service brand package corresponding with the first service brand network based on the mapping via the lookup table;

activating the first service brand package based on the received signal, the power level of the received signal, and the identification of the first service brand package;

responsive to the activation of the first service brand package, provisioning the mobile device with the first service brand package associated with the first service brand network, wherein provisioning comprises:

installing provisioning data associated with the first service brand package stored on the mobile device, and branding and customizing the mobile device according to the first service provider through the use of the first service brand package;

receiving mobile service on the mobile device, wherein the mobile service is provided by the first service brand network based on the first service brand package;

removing the mobile device from the first service brand network;

subsequent to removing the mobile device from the first service brand network and the mobile device being provisioned via another service brand package, receiving a signal on the mobile device associated with the first service brand network; and reprovisioning the mobile device with the first service brand package associated with the first service brand network without reinstalling the provisioning data associated with the first service brand package stored on the mobile device, wherein reprovisioning comprises rebranding and recustomizing the mobile device according to the first service provider through the use of the first service brand package.

17. The method of claim 16, wherein removing the mobile device from the first service brand network comprises at least one of removing the mobile device out of a geographic reach of the first service brand network or receiving an input, via an interface of the mobile device, that deselects the first service brand network from providing mobile service.

18. The method of claim 16, further comprising:

receiving a signal on the mobile device associated with the second service brand network or a third service brand network after removing the mobile device from the first service brand network;

provisioning the mobile device with the second service brand package associated with the second service brand network or the third service package associated with a third service brand, wherein provisioning comprises installing provisioning data associated with the second service brand package or a third service brand package stored on the mobile device and branding and customizing the mobile device according to the second service provider through the use of the second service brand package or a third service provider through the use of the third service brand package;

receiving mobile service on the mobile device, wherein the mobile service is provided by the second service brand network associated with the second service provider or the third service brand network associated with the third service provider; and removing the mobile device from the second service brand network or the third service brand network before reprovisioning the mobile device with the first service brand package associated with the first service brand network.

* * * * *